(12) United States Patent
Schoenherr et al.

(10) Patent No.: US 12,304,483 B2
(45) Date of Patent: May 20, 2025

(54) METHOD AND DRIVER-ASSISTANCE SYSTEM FOR OPERATING A SINGLE-TRACK OR MULTI-TRACK VEHICLE

(71) Applicant: Robert Bosch GmbH, Stuttgart (DE)

(72) Inventors: Michael Schoenherr, Renningen-Malmsheim (DE); Mathieu Grelaud, Ludwigsburg (DE); Thorsten Schori, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 262 days.

(21) Appl. No.: 17/910,513

(22) PCT Filed: Mar. 1, 2021

(86) PCT No.: PCT/DE2021/100205
§ 371 (c)(1),
(2) Date: Sep. 9, 2022

(87) PCT Pub. No.: WO2021/254553
PCT Pub. Date: Dec. 23, 2021

(65) Prior Publication Data
US 2023/0137313 A1 May 4, 2023

(30) Foreign Application Priority Data
Jun. 17, 2020 (DE) ..................... 10 2020 207 502.6

(51) Int. Cl.
*B60W 30/16* (2020.01)
*B60W 50/14* (2020.01)

(52) U.S. Cl.
CPC ............ *B60W 30/16* (2013.01); *B60W 50/14* (2013.01); *B60W 2050/143* (2013.01);
(Continued)

(58) Field of Classification Search
None
See application file for complete search history.

(56) References Cited

U.S. PATENT DOCUMENTS

2003/0038714 A1    2/2003  Matsumoto et al.
2004/0093145 A1*   5/2004  Tanimichi .............. B60K 31/04
                                                                701/93
(Continued)

FOREIGN PATENT DOCUMENTS

EP        1419924 A1     5/2004
JP     2005149200 A      6/2005
(Continued)

OTHER PUBLICATIONS

International Search Report for PCT/DE2021/100205, Issued Jun. 1, 2021.

*Primary Examiner* — Aniss Chad
*Assistant Examiner* — Jennifer M Anda
(74) *Attorney, Agent, or Firm* — NORTON ROSE FULBRIGHT US LLP

(57) ABSTRACT

A method for operating a single-track or multi-track vehicle including a driver-assistance system. In the method, a speed of the vehicle and a distance of the vehicle from a vehicle in front are controlled. The speed is controlled within a system-related speed range of the driver-assistance system using a position of an operating element of the vehicle and is controlled up to an optional target speed that is selectable within the speed range. Before an upper limit of the speed range is exceeded, a warning signal is provided to a driver of the vehicle. The distance is controlled within the speed range in a speed-dependent distance buffer region depending on the position.

9 Claims, 1 Drawing Sheet

(52) U.S. Cl.
CPC .............. *B60W 2050/146* (2013.01); *B60W 2554/4041* (2020.02); *B60W 2554/802* (2020.02)

(56) References Cited

U.S. PATENT DOCUMENTS

| | | | |
|---|---|---|---|
| 2005/0150701 A1 | 7/2005 | Michi et al. | |
| 2007/0156321 A1* | 7/2007 | Schad ................... | B60K 31/00 701/96 |
| 2011/0050459 A1* | 3/2011 | Vasireddy ........ | G08G 1/096716 340/905 |
| 2011/0187522 A1* | 8/2011 | Filev .................... | B60W 50/16 340/441 |
| 2015/0175162 A1* | 6/2015 | Nakadori ............. | B60W 30/16 701/96 |
| 2019/0291733 A1* | 9/2019 | Limbacher ............ | B60W 50/14 |
| 2022/0266829 A1* | 8/2022 | Thompson .......... | B60W 50/087 |

FOREIGN PATENT DOCUMENTS

| | | |
|---|---|---|
| JP | 2008001285 A | 1/2008 |
| JP | 2010095219 A | 4/2010 |

* cited by examiner

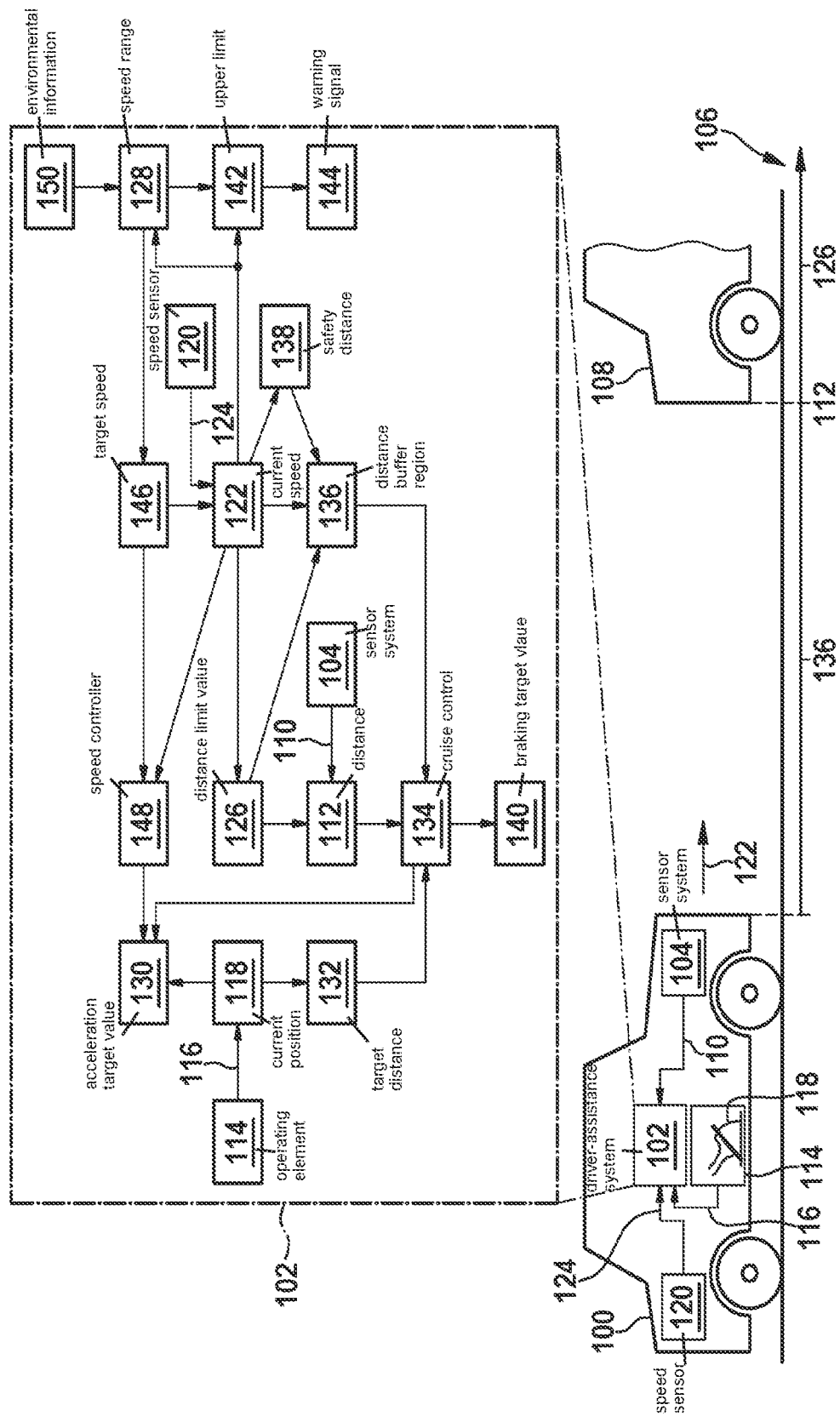

METHOD AND DRIVER-ASSISTANCE SYSTEM FOR OPERATING A SINGLE-TRACK OR MULTI-TRACK VEHICLE

FIELD

The present invention relates to a method for operating a single-track or multi-track vehicle and to a corresponding driver-assistance system.

BACKGROUND INFORMATION

A vehicle may comprise driver-assistance systems. For example, the vehicle may comprise a driver-assistance system referred to as cruise control, which maintains a vehicle speed within a tolerance range around a target speed value predetermined by a driver of the vehicle.

The cruise control may be configured as adaptive cruise control. In this case, the speed can be controlled to the target speed value until a vehicle in front is detected by a sensor system of the vehicle and the vehicle in front is driving ahead of the vehicle at a smaller distance than a selectable target distance. A power output of the vehicle is then throttled until the vehicle is driving behind the vehicle in front within a tolerance range around the target distance. The adaptive cruise control may also actuate a brake system of the vehicle in order to keep the distance within the tolerance range.

SUMMARY

According to the present invention, a method for operating a single-track or multi-track vehicle, a corresponding driver-assistance system, and, lastly, a corresponding computer program product and a machine-readable storage medium are provided.

Advantageous example embodiments, developments, and improvements of the present invention are disclosed herein.

Advantageously, specific example embodiments of the present invention make it possible for a driver of a single-track or multi-track vehicle to use an accelerator pedal or gas pedal, or a twist grip throttle or twistgrip, of the vehicle as normal in order to control a speed of the vehicle until the vehicle approaches a vehicle in front or the speed approaches a target speed selected by the driver.

If the vehicle reduces a distance from the vehicle in front to below a target distance at an accelerator pedal angle currently set by the driver or a twist grip throttle position currently set by the driver, then the vehicle will be decelerated by a system intervention until the target distance is adhered to. In the process, the driver may influence the target distance within a speed-dependent buffer region by way of the accelerator pedal angle or the twist grip throttle position.

If the vehicle drives faster than the target speed at the accelerator pedal angle currently set by the driver or the twist grip throttle position currently set by the driver, then the vehicle will likewise be braked by a system intervention until the target speed is adhered to. In the process, the driver can select the target speed as desired within a system-related speed range. The target speed can be exceeded by vigorously depressing the accelerator pedal or twisting the twist grip throttle. The driver does not have to select a target speed, either. The system-related speed range can also be exceeded by vigorously depressing the accelerator pedal or twisting the twist grip throttle. The driver is, however, warned before they leave the speed range since the cruise control is deactivated in a system-related manner or may have limited functionality above the speed range.

According to an example embodiment of the present invention, a method is provided for operating a single-track or multi-track vehicle, wherein a speed of the vehicle and a distance of the vehicle from a vehicle in front are controlled, wherein the speed is controlled within a system-related speed range using a position of an operating element of the vehicle and is controlled up to an optional target speed that is selectable within the speed range, wherein, before an upper limit of the speed range is exceeded, a warning signal is provided to a driver of the vehicle, wherein the distance is controlled within the speed range in a speed-dependent distance buffer region depending on the position.

Ideas for specific embodiments of the present invention may, inter alia, be considered to be based on the concepts and knowledge described in the following.

A vehicle may, for example, be a car, a truck, a motorcycle, or an all-terrain vehicle. The car and the truck may comprise an accelerator pedal or gas pedal as the operating element. The motorcycle may comprise a twist grip throttle or twistgrip as the operating element. The all-terrain vehicle may comprise an accelerator lever or gas lever as the operating element. A position of the operating element may therefore be an accelerator pedal angle, a twist grip throttle position, or a lever position.

The vehicle may comprise a sensor system for detecting a detection region, in particular in front of the vehicle. The sensor system may be radar-based, LiDAR-based, or camera-based, for example. If another vehicle is driving in the detection region in front of the vehicle, the sensor system can detect a distance between the two vehicles. An item of information regarding the distance can be provided for at least one driver-assistance system of the vehicle. A system-related speed range may have an upper limit and a lower limit. The system-related speed range may be defined depending on properties of the vehicle and components accommodated in the vehicle. The upper limit may be determined by the performance capability of the sensor system, for example. For example, a sensor range of at least one sensor of the sensor system may predefine the upper limit. The lower limit may be when the vehicle is at a standstill, for example.

A target speed may optionally be predetermined by a driver of a vehicle. For example, the target speed may be set via the pedal position of the car, the twist grip throttle position of the motorcycle, or the lever position of the all-terrain vehicle, and then stored. The target speed may be set and deleted again via an interface of the driver-assistance system, for example. The interface may be configured as levers, buttons, or a touch surface, for example. The target speed may also be increased or decreased in specified increments or intervals. Likewise, the target speed may be set to previously stored values. The target speed may also be predetermined by the vehicle recognizing a sign. Below the target speed, the driver can determine the speed of the vehicle by way of the operating element. The target speed preferably remains active even if the driver depresses a brake pedal of the vehicle or pulls a brake lever.

According to an example embodiment of the present invention, a distance buffer region may be arranged between the vehicle and the vehicle in front. The distance buffer region may be further away from the vehicle in front at high speeds than at low speeds. The more the driver depresses the accelerator pedal or twists the twist throttle grip when the vehicle is being maintained within the distance buffer region, the closer the vehicle gets to the vehicle in front. The distance buffer region may act as a virtual air cushion between the vehicles. The more the driver depresses the accelerator pedal or twists the twist throttle grip, the further the air cushion is compressed, and vice versa. In the process, at least a minimum speed-dependent safety distance from the vehicle in front is always maintained.

When the vehicle is driving within the distance buffer region and the vehicle driving in front brakes, the vehicle is likewise braked using its drive and/or its brakes in order to maintain the distance set via the operating element in a speed-dependent manner.

Before the vehicle drives faster than the upper limit of the speed range, a warning signal provides a warning to the driver since the distance can no longer be safely controlled above the upper limit.

The warning signal may likewise be provided before the target speed is exceeded. The target speed is not a hard limit and may be surpassed. By way of example, a currently applicable speed limit may, however, be exceeded, at the driver's own risk.

A visible display may be provided for the driver as the warning signal. A warning light may be activated, for example. Likewise, a warning symbol may also be displayed in the driver's field of view.

A change in a vehicle characteristic of the vehicle may be set as the warning signal. The vehicle characteristic of the vehicle may be a vehicle property perceptible to the driver. The vehicle may undergo an acceleration jerk, for example. The acceleration jerk may be positive or negative in this respect. Likewise, the warning may be communicated through vibration of the operating element, steering wheel, or seat.

A resistance of the operating element may be increased as the change in the vehicle characteristic. Owing to the increased resistance, a greater force is required to overcome the resistance. The increased resistance may be maintained for a short time. Likewise, the increased resistance may be maintained for as long as the vehicle is driving at a speed above the upper limit.

Non-acceptance of a change in the position of the operating element may be set as the change in the vehicle characteristic. In the event of this non-acceptance, the accelerator pedal may be depressed to a greater extent or the twist grip throttle twisted to a greater extent without the drive providing more power, i.e., the change in the position implemented by the driver is ignored by the vehicle, so to speak. By the same token, the drive may immediately reduce the output power if the accelerator pedal is depressed to a lesser extent or the twist grip throttle is twisted to a lesser extent. This non-acceptance may be overridden by a kickdown.

The target speed and/or the upper limit may be exceeded if a position gradient is greater than a breach value. A position gradient represents a movement speed of the operating element. The position gradient may therefore be an accelerator pedal angle gradient or a twist grip throttle angle gradient. At a high position gradient, the operating element is operated rapidly. The high position gradient may, for example, be used in a particular situation if the driver intentionally wishes to exceed the target speed and/or the upper limit.

The upper limit may be set depending on a system status of the driver-assistance system. The driver-assistance system may lower the upper limit if the recognition performance of the sensor system declines, for example. In that case, the vehicle in front might be recognized too late, for example. Likewise, the upper limit may be lowered if wheels of the vehicle lose road adhesion. In that case, the braking performance of the vehicle may deteriorate and the safety distance cannot be maintained. For example, the upper limit may be lowered in the event of precipitation to ensure the vehicle can be operated safely. Likewise, the upper limit may be lowered if the vehicle is driving on loose or smooth ground.

The method may be implemented, for example, in software or hardware or in a mixed form of software and hardware, for example in a control device.

The present invention further provides a driver-assistance system which is configured to carry out, actuate, or implement the steps of a variant of the method presented here in corresponding apparatuses.

The driver-assistance system may be an electrical device comprising at least one arithmetic logic unit for processing signals or data, at least one storage unit for storing signals or data, and at least one interface and/or communication interface for inputting or outputting data embedded in a communication protocol. The arithmetic logic unit may, for example, be a signal processor, a so-called system ASIC, or a microcontroller for processing sensor signals and outputting data signals on the basis of the sensor signals. The storage unit may, for example, be a flash memory, an EPROM, or a magnetic storage unit. The interface may be configured as a sensor interface for inputting the sensor signals from a sensor and/or as an actuator interface for outputting the data signals and/or control signals to an actuator. The communication interface may be configured to input or output the data wirelessly and/or in a wired manner. The interfaces may also be software modules which are provided on a microcontroller in addition to other software modules, for example.

According to an example embodiment of the present invention, also advantageous is a computer program product or computer program comprising program code which may be stored on a machine-readable carrier or storage medium, such as a semiconductor memory, a hard-disk memory, or an optical memory, and is used for carrying out, implementing, and/or actuating the steps of the method as recited in one of the above-described specific embodiments, in particular if the program product or program is executed on a computer or a driver-assistance system.

It should be noted that some of the possible features and advantages of the present invention are described herein with reference to different specific embodiments. A person skilled in the art recognizes that the features of the control device and the method can be combined, adjusted, or interchanged in a suitable manner in order to arrive at further specific embodiments of the present invention.

BRIEF DESCRIPTION OF THE DRAWINGS

In the following, specific embodiments of the present invention will be explained with reference to the FIGURES, although neither the FIGURES nor the description should be construed as limiting the present invention.

FIG. 1 shows a vehicle comprising a driver-assistance system according to an exemplary embodiment of the present invention.

This FIGURE is merely schematic and is not to scale. In the FIGURE, identical reference numerals denote identical or identically functioning features.

DETAILED DESCRIPTION OF EXAMPLE EMBODIMENTS

FIG. 1 shows a vehicle 100 comprising a driver-assistance system 102 according to an exemplary embodiment. The vehicle 100 is a car in this case. The approach presented here may accordingly also be used in a motorcycle, a truck, or a quad bike or all-terrain vehicle. The vehicle 100 comprises a sensor system 104 for detecting other vehicles at least in the travel direction in front of the vehicle 100. The other vehicles can be detected within a sensor range 106 of the sensor system 104. The sensor range 106 is specific to the sensor system 104. The sensor range 106 is also dependent on environmental conditions. For example, the sensor range 106 is lower when it is raining than when it is not raining.

If the sensor system 104 detects a vehicle 108 in front of the vehicle 100, an item of distance information 110 is provided which maps a distance 112 between the vehicle 100 and the vehicle 108 in front.

An operating element 114 of the vehicle 100 provides an operating-element signal 116. The operating-element signal 116 maps a current position 118 of the operating element 114. Here, an accelerator pedal 114 of the car provides an accelerator pedal signal 116. The accelerator pedal signal 116 maps a current accelerator pedal angle 118 of the accelerator pedal 114.

A speed sensor 120 of the vehicle 100 maps a current speed 122 of the vehicle 100 in a speed signal 124.

The driver-assistance system 102 inputs the operating-element signal 116, the speed signal 124, and the distance information 110.

Provided that the distance 112 is greater than a speed-dependent distance limit value 126 and the speed 122 is within a system-related speed range 128, the position 118 is directly converted into an acceleration target value 130. A driver of the vehicle 100 can thus control the speed 122 as normal via the operating element 114.

If the distance 112 is less than the speed-dependent distance limit value 126 and the speed 122 is within the system-related speed range 128, the position 118 is converted into a target distance 132 for a cruise control 134 of the driver-assistance system 102. The target distance 132 can be set within a distance buffer region 136. The distance buffer region 136 begins at the speed-dependent distance limit value 126 and ends at a speed-dependent safety distance 138 from the vehicle 108 in front. The cruise control 134 controls the acceleration target value 130 or a braking target value 140 using the distance 112 and the target distance 132.

If the speed 122 exceeds an upper limit 142 of the speed range 128, the driver will be provided with a warning by a warning signal 144 since, above the upper limit 142, the sensor range 106 of the sensor system 104 is insufficient for reliably providing the distance information 110.

The driver may optionally set a target speed 146 within the speed range 128 for a speed controller 148 of the driver-assistance system 102. If the distance 112 is greater than the speed-dependent distance limit value 126 and the speed 122 is less than the target speed 146, the position 118 is directly converted into the acceleration target value 130. If the speed 122 reaches the target speed 146 or just below the target speed 146, the speed controller 148 limits the acceleration target value 130.

If the distance 112 is within the distance buffer region 136 and the speed 122 is less than the target speed 146, the position 118 is converted into the target value 132. If the speed 122 reaches the target speed 146 or just below the target speed 146, the speed controller 148 limits the acceleration target value 130 even if the distance 112 becomes greater than the target distance 132 as a result.

Since the cruise control is dependent on environmental conditions, in one exemplary embodiment, the upper limit 142 is lowered if the environmental conditions deteriorate. To do so, the driver-assistance system inputs an item of environmental information 150 mapping the environmental conditions and adjusts the upper limit 142 to the environmental conditions.

In other words, the automatic activation of a speed limiter is described.

In vehicles there are different driver-assistance systems which give the driver increased comfort and greater safety, such as adaptive cruise control (ACC) and highway assist (HWA). Furthermore, other assistance systems provide an increase in safety by way of distance warnings and emergency braking interventions.

In particular, another, driver-oriented assistance function called dynamic distance assist (DDA) largely takes over the pedal braking from the driver but leaves them to operate the gas pedal.

For a distance limiter or also for DDA, there is the option of activating a speed limiter or ACC in addition. Therefore, it can be guaranteed not only that a minimum distance is ensured but also that a predetermined maximum speed can be maintained.

In this case, current ACC systems have different maximum speeds (e.g., 160 km/h, 210 km/h, or also 250 km/h), which can be preset. It is thus guaranteed that ACC is used in a speed range in which it achieves its desired and known performance. It can be controlled by the driver.

For distance-maintaining functions, such as distance limiters or DDA, the question is then how to draw the driver's attention to the system limits at higher speeds, in particular in the sports car sector, if they themselves predetermine the speed by way of the accelerator pedal.

In the approach presented here, when the distance limiter or DDA is activated, an upper speed limit (v-max) is automatically activated. The driver is thus aware that, when using these assistance functions, they can only rely on the desired performance in a certain speed range.

In addition to the automatic activation of an upper speed limit, a two-stage limiter is presented here.

The first speed limit is similar to currently conventional speed limiters. It may, e.g., be set to 50 km/h when driving in urban environments or to 120 km/h when driving on motorways.

Conventional activation conditions, functional behavior, and deactivation conditions may be involved.

The second speed limit is configured to take account of the sensor performance (e.g., 160 km/h, 210 km/h, or 250 km/h). Where necessary, the second speed limit may be somewhat higher than for ACC since the driver is actively involved in the driving process due to the use of the gas pedal. The second speed limit may be automatically activated when the distance limiter or DDA is activated. The second speed limit may not be changed or may not be changed easily and/or changed while driving using the operating apparatus since it affects the sensor performance.

In one exemplary embodiment of the present invention, however, it is variable within certain ranges and can be adjusted to the environmental conditions. For instance, the upper speed limit can be adjusted in heavy rain. In this case, the upper limit is not replaced or deactivated when a normal/lower speed limit is set. The upper speed limit remains even when the lower speed limit is deactivated.

If the driver still wishes to increase the speed above the upper limit, they can do so by deactivating the distance limiter or DDA using the operating apparatus. They can also carry out temporary deactivation by way of a very high accelerator pedal angle or a kickdown. Advantageously, when approaching the upper speed limit, the driver is notified early enough so that they can override the upper limit in good time as required. The upper speed limit may also be used in vehicles without an adjustable, known speed limiter.

Lastly, it should be noted that terms such as "having," "comprising," etc., do not exclude any other elements or steps, and terms such as "a," "an," or "one" do not exclude a multiplicity.

What is claimed is:

1. A method for operating an ego single-track or multi-track vehicle including a driver-assistance system, the method comprising the following steps:
    setting values of driver-assistance settings, setting an actual vehicle speed, and setting an actual vehicle distance of the ego vehicle from a leading vehicle based on (I) a speed range that is dynamically adjusted according to sensor capabilities that are dependent on sensed current environmental conditions, (II) a system-defined speed-dependent safety distance that must be maintained from the ego vehicle to the leading vehicle for the driver-assistance system to be able to control the ego vehicle to avoid collisions with the leading vehicle, (III) a speed-dependent distance limit value, a dropping of the actual vehicle distance to below which is responded to by the driver-assistance system controls the actual vehicle speed in order to maintain a safe value for the actual distance and (IV) a speed-dependent distance buffer region that extends between the system-defined speed-dependent safety distance and the speed-dependent distance limit value, wherein the setting of the values includes:
        in response to an operating element of the ego vehicle being manipulated to a new position during a predetermined system state that is defined at least by that (I) the actual vehicle speed is within the speed range and (II) the actual vehicle distance is greater than the speed-dependent distance limit value, setting an acceleration target value in correspondence with the new position; and
        in response to the operating element of the ego vehicle being manipulated to a further new position during a further predetermined system state that is defined at least by that (I) the actual vehicle speed is below a target speed and (II) the actual vehicle distance is within the distance buffer region, bringing the actual vehicle speed towards a speed value in correspondence with the further new position, but at an acceleration selected by the driver-assistance system according to a target distance (i) that is less than the speed-dependent distance limit value and (ii) that had been previously set by a prior manipulation of the operating element;
    in response to the actual vehicle speed being raised, by manipulation of the operating element, to a speed value that is near, by a predetermined amount, a maximum value of the speed range, providing a warning signal to a driver of the vehicle; and
    controlling the actual vehicle distance while maintaining the actual vehicle speed of the ego vehicle within the speed range according to the target distance that is in the speed-dependent distance buffer region, the acceleration target value, and the target speed.

2. The method as recited in claim 1, wherein a visible display is provided for the driver as the warning signal.

3. The method as recited in claim 1, wherein a change in a vehicle characteristic of the vehicle is set as the warning signal.

4. The method as recited in claim 3, wherein a resistance of the operating element is increased as the change in the vehicle characteristic.

5. The method as recited in claim 3, wherein non-acceptance of a change in the position is set as the change in the vehicle characteristic.

6. The method as recited in claim 1, wherein the actual vehicle speed is controlled to exceed the target speed and/or the maximum value of the speed range in response to a manipulation of the operating element with a position gradient that is greater than a predefined breach value.

7. The method as recited in claim 1, wherein the maximum value of the speed range upper limit is set depending on a system status of the driver-assistance system.

8. A driver-assistance system for operating an ego single-track or multi-track vehicle, the driver assistance system configured to:
    set values of driver-assistance settings, setting an actual vehicle speed, and setting an actual vehicle distance of the ego vehicle from a leading vehicle based on (I) a speed range that is dynamically adjusted according to sensor capabilities that are dependent on sensed current environmental conditions, (II) a system-defined speed-dependent safety distance that must be maintained from the ego vehicle to the leading vehicle for the driver-assistance system to be able to control the ego vehicle to avoid collisions with the leading vehicle, (III) a speed-dependent distance limit value, a dropping of the actual vehicle distance to below which is responded to by the driver-assistance system controls the actual vehicle speed in order to maintain a safe value for the actual distance, and (IV) a speed-dependent distance buffer region that extends between the system-defined speed-dependent safety distance and the speed-dependent distance limit value, wherein the setting of the values includes:
        in response to an operating element of the ego vehicle being manipulated to a new position during a predetermined system state that is defined at least by that (I) the actual vehicle speed is within the speed range and (II) the actual vehicle distance is greater than the speed-dependent distance limit value, setting an acceleration target value in correspondence with the new position; and
        in response to the operating element of the ego vehicle being manipulated to a further new position during a further predetermined system state that is defined at least by that (I) the actual vehicle speed is below a target speed and (II) the actual vehicle distance is within the distance buffer region, bringing the actual vehicle speed towards a speed value in correspondence with the further new position, but at an acceleration selected by the driver-assistance system according to a target distance (i) that is less than the speed-dependent distance limit value and (ii) that had been previously set by a prior manipulation of the operating element;
    in response to the actual vehicle speed being raised, by manipulation of the operating element, to a speed value that is near, by a predetermined amount, a maximum value of the speed range, provide a warning signal to a driver of the vehicle; and
    control the actual vehicle distance while maintaining the actual vehicle speed of the ego vehicle within the speed range according to the target distance that is in the speed-dependent distance buffer region, the acceleration target value, and the target speed.

9. A non-transitory machine-readable storage medium on which is stored a computer program for operating an ego single-track or multi-track vehicle including a driver-assistance system, the computer program, when executed by a computer, causing the computer to perform the following steps:

setting values of driver-assistance settings, setting an actual vehicle speed, and setting an actual vehicle distance of the ego vehicle from a leading vehicle based on (I) a speed range that is dynamically adjusted according to sensor capabilities that are dependent on sensed current environmental conditions, (II) a system-defined speed-dependent safety distance that must be maintained from the ego vehicle to the leading vehicle for the driver-assistance system to be able to control the ego vehicle to avoid collisions with the leading vehicle, (III) a speed-dependent distance limit value, a dropping of the actual vehicle distance to below which is responded to by the driver-assistance system controls the actual vehicle speed in order to maintain a safe value for the actual distance, and (IV) a speed-dependent distance buffer region that extends between the system-defined speed-dependent safety distance and the speed-dependent distance limit value, wherein the setting of the values includes:

in response to an operating element of the ego vehicle being manipulated to a new position during a predetermined system state that is defined at least by that (I) the actual vehicle speed is within the speed range and (II) the actual vehicle distance is greater than the speed-dependent distance limit value, setting an acceleration target value in correspondence with the new position; and in response to the operating element of the ego vehicle being manipulated to a further new position during a further predetermined system state that is defined at least by that (I) the actual vehicle speed is below a target speed and (II) the actual vehicle distance is within the distance buffer region, bringing the actual vehicle speed towards a speed value in correspondence with the further new position, but at an acceleration selected by the driver-assistance system according to a target distance (i) that is less than the speed-dependent distance limit value and (ii) that had been previously set by a prior manipulation of the operating element;

in response to the actual vehicle speed being raised, by manipulation of the operating element, to a speed value that is near, by a predetermined amount, a maximum value of the speed range, providing a warning signal to a driver of the vehicle; and controlling the actual vehicle distance while maintaining the actual vehicle speed of the ego vehicle within the speed range according to the target distance that is in the speed-dependent distance buffer region, the acceleration target value, and the target speed.

* * * * *